(12) United States Patent
Umetani (10) Patent No.: US 9,590,491 B2
(45) Date of Patent: Mar. 7, 2017

(54) RESONANT CURRENT LIMITING DEVICE

(71) Applicant: DENSO CORPORATION, Kariya, Aichi-pref. (JP)

(72) Inventor: Kazuhiro Umetani, Nagoya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/821,064

(22) Filed: Aug. 7, 2015

(65) Prior Publication Data

US 2016/0056711 A1 Feb. 25, 2016

(30) Foreign Application Priority Data

Aug. 19, 2014 (JP) .................................. 2014-166688

(51) Int. Cl.
*H02M 1/32* (2007.01)
*H02M 3/158* (2006.01)
*H02M 1/00* (2006.01)

(52) U.S. Cl.
CPC ........... *H02M 1/32* (2013.01); *H02M 3/1582* (2013.01); *H02M 2001/0058* (2013.01)

(58) Field of Classification Search
CPC .... H02M 7/797; H02M 7/4826; H02M 7/537; H02M 2001/0003; H02M 2007/4811; H02M 2007/4815; H02M 1/32; H02M 2001/0083; H02M 2001/0093
See application file for complete search history.

(56) References Cited

U.S. PATENT DOCUMENTS

| | | | | | |
|---|---|---|---|---|---|
| 5,038,267 | A | * | 8/1991 | De Doncker | H02M 7/4826 363/124 |
| 5,495,404 | A | * | 2/1996 | Stephens | H02M 7/538 363/132 |
| 5,627,741 | A | * | 5/1997 | Naruo | H02M 1/4208 363/89 |
| 6,194,845 | B1 | * | 2/2001 | Konopka | H02M 7/538 315/209 R |
| 9,173,256 | B1 | * | 10/2015 | Xiong | H02M 3/3385 |
| 2001/0026460 | A1 | * | 10/2001 | Ito | H02M 5/4585 363/34 |
| 2002/0012257 | A1 | * | 1/2002 | Takahama | H02M 3/337 363/95 |

(Continued)

FOREIGN PATENT DOCUMENTS

JP 8-168176 A 6/1996
JP 10-336896 A 12/1998
(Continued)

*Primary Examiner* — Timothy J Dole
*Assistant Examiner* — Yusef Ahmed
(74) *Attorney, Agent, or Firm* — Posz Law Group, PLC (57) ABSTRACT

A resonant current limiting device, for a resonant current passage having a loop shape including at least one capacitor and a wiring passage with at least one inductor or inductance component, includes: an electric storage element connected in series with the capacitor; a driving power source; and a voltage controller that charges and discharges an electric charge in the electric storage element, which is supplied from the driving power source, controls a terminal voltage of the electric storage element to be a predetermined instruction voltage, and restricts a resonant current component flowing through the wiring passage.

18 Claims, 6 Drawing Sheets

(56) References Cited

U.S. PATENT DOCUMENTS

| | | | | |
|---|---|---|---|---|
| 2003/0160571 | A1* | 8/2003 | Moisin | H05B 41/2851 315/224 |
| 2004/0156219 | A1* | 8/2004 | Chapuis | H02M 3/157 363/89 |
| 2004/0240240 | A1* | 12/2004 | Bijlenga | H02M 7/4826 363/56.12 |
| 2004/0246746 | A1* | 12/2004 | Norrga | H02M 7/4826 363/16 |
| 2006/0213890 | A1* | 9/2006 | Kooken | B23K 9/095 219/130.21 |
| 2008/0157863 | A1 | 7/2008 | Hatanaka et al. | |
| 2011/0096571 | A1* | 4/2011 | Usuda | H02M 3/157 363/21.1 |
| 2011/0139771 | A1* | 6/2011 | Dohmeier | H02M 7/5387 219/661 |
| 2012/0069604 | A1* | 3/2012 | Yagyu | H02M 1/34 363/20 |
| 2012/0223667 | A1* | 9/2012 | Wang | H02M 3/1588 318/768 |
| 2014/0210442 | A1* | 7/2014 | Umetani | H02M 3/1588 323/282 |
| 2014/0211515 | A1* | 7/2014 | Tomioka | H02M 3/158 363/21.02 |
| 2014/0268894 | A1* | 9/2014 | Shinohara | H02M 3/33592 363/17 |
| 2014/0268899 | A1* | 9/2014 | Hosotani | H02M 3/33569 363/17 |
| 2014/0327420 | A1* | 11/2014 | Lee | H02M 3/07 323/282 |
| 2014/0369090 | A1* | 12/2014 | Ueki | H02M 1/15 363/41 |
| 2015/0303813 | A1* | 10/2015 | Cheng | H02M 1/4258 363/21.02 |
| 2015/0349627 | A1* | 12/2015 | Lin | H02M 3/337 363/21.02 |
| 2016/0099649 | A1* | 4/2016 | Hara | H02M 3/3353 363/17 |
| 2016/0111896 | A1* | 4/2016 | Kamata | H02J 7/025 307/104 |

FOREIGN PATENT DOCUMENTS

| | | |
|---|---|---|
| JP | 2000-295771 A | 10/2000 |
| JP | 2004-236395 A | 8/2004 |

* cited by examiner

PRIOR ART

RESONANT CURRENT LIMITING DEVICE

CROSS REFERENCE TO RELATED APPLICATIONS

This application is based on Japanese Patent Application No. 2014-166688 filed on Aug. 19, 2014, the disclosure of which is incorporated herein by reference.

TECHNICAL FIELD

The present disclosure relates to a resonant current limiting device for limiting resonance occurred on a resonant current passage having a loop shape with an inductor and a capacitor.

BACKGROUND

Figure 9:
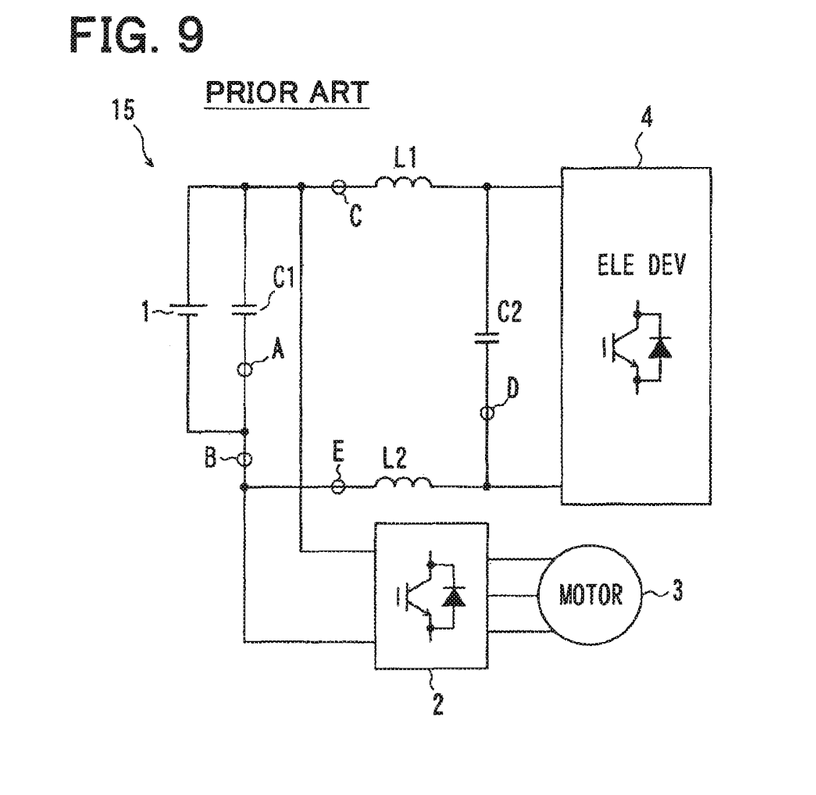
FIG. 9 is a diagram showing an electric device system according to a comparison as a related art.

Recently, an electric vehicle and a hybrid vehicle having a system for moving a vehicle with a motor become popular in view of environmental consciousness. A general electric construction of these vehicles is shown in FIG. 9. A smoothing capacitor C1 and an inverter circuit 2 are connected between both ends of a battery 1. A motor 3 for moving a vehicle is controlled by the inverter circuit 2. Further, Another smoothing capacitor C2 and an electric device 4 are connected between both ends of the smoothing capacitor C1 via inductors L1, L2. The electric device 4 is, for example, a vehicular electronic apparatus or an auxiliary electronic apparatus such as a battery charger when the vehicle is the electric vehicle.

The inverter circuit 2 generates noise when the circuit 2 executes a switching operation of large current. When the noise penetrates into the electric device 4, an operation failure may be occurred. Thus, in order to restrict the noise from penetrating, the inductors L1, L2 are arranged on a power source line between the battery 1 and the electric device 4, or a filter is provided by an inductance component in the power source line.

When the inductors L1, L2 are arranged in the power source line, a parasitic LC resonance may occur between the battery 1 or the smoothing capacitor C1 and the other smoothing capacitor C2 on the electric device side. Therefore, heat may generate since the large resonant current flows through the smoothing capacitor C2. Accordingly, it is necessary to restrict the resonance between the capacitors C1, C2.

JP-2000-295771 A teaches a technique for restricting the resonance. In JP-2000-295771 A, a capacitor is connected to an inverter circuit, and another capacitor is connected to a portion (on an output side of a rectifying circuit) facing the inductor. The capacitor and the other capacitor are connected in series to a secondary winding of a transformer. A voltage in proportion to a load current is applied to a primary winding of the transformer, so that the resonance is restricted.

Here, assuming that the construction described in JP-2000-295771 A is combined with the system in FIG. 9, the transformer may be arranged at one of points A to E in FIG. 9 disposed on a resonant passage. However, since conduction loss of the transformer, generated in a case where the windings are energized, is large, an efficiency may be not high. Further, even if the transformer is arranged at one of five points, the following difficulties may occur.

For example, when the transformer is arranged at the point A, the resonance at the capacitor C1 is restricted. However, the resonance generated on a passage between the battery 1 and the capacitor C2 via the inductor L1 is not restricted.

Further, when the transformer is arranged at the point B, and the point B is disposed on a passage of an input current to the inverter circuit 2, the input current is detected, and the voltage is applied to the transformer, so that the power source voltage to be supplied to the inverter circuit 2 may be reduced. Further, the inverter circuit 2 turns on and off the input current while the circuit 2 executes the switching operation. In general, a large parasitic inductance may be provided by the transformer. Thus, a large switching surge may occur when the circuit 2 turns on and off the input current.

When the transformer is arranged at the point C or the point E, it is necessary to form a gap at a core of the transformer since the direct current flows through the transformer. Thus, since large invalidation current (i.e., wattles current) flows through a structure for applying the voltage to the transformer, the efficiency may be reduced, and the size of circuit elements to be used on the structure may increase.

When the transformer is arranged at the point D, the current of the capacitor C2 is drawn into the point D when the consumption current of the electric device 4 is changed transitionally. Accordingly, similar to the point B, the power source voltage to be supplied to the inerter circuit 2 may be reduced. When the electric device 4 turns on and off the input current, the large switching surge may be generated according to the switching operation of the electric device 4.

SUMMARY

It is an object of the present disclosure to provide a resonant current limiting device for restricting resonance on a resonant current passage.

According to an aspect of the present disclosure, a resonant current limiting device, for a resonant current passage having a loop shape including at least one capacitor and a wiring passage that includes at least one inductor or at least one inductance component, includes: an electric storage element connected in series with the capacitor; a driving power source; and a voltage controller that charges and discharges an electric charge in the electric storage element, which is supplied from the driving power source, controls a terminal voltage of the electric storage element to be a predetermined instruction voltage, and restricts a resonant current component flowing through the wiring passage.

Since a voltage variation of a resonant frequency component applied to an inductor or an inductance component is not restricted, LC resonant phenomenon occurs at the resonant current passage. Thus, in the above resonant current limiting device, the terminal voltage of the electric storage element connected in series with the capacitor is controlled by the voltage controller, so that the voltage variation of the inductor or the inductance component is restricted. Thus, the resonant phenomenon is limited. Since there is no transformer in the resonant current limiting device, there is no conduction loss generated in a winding. Further, since each of the capacitor and the electric storage element has a capacitive impedance, when the series circuit of the capacitance and the electric storage element is connected in parallel to the electric device, a switching surge occurred when the electric device functions and power source voltage reduction are restricted, and further, the resonant is also restricted.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

First Embodiment

Figure 1:
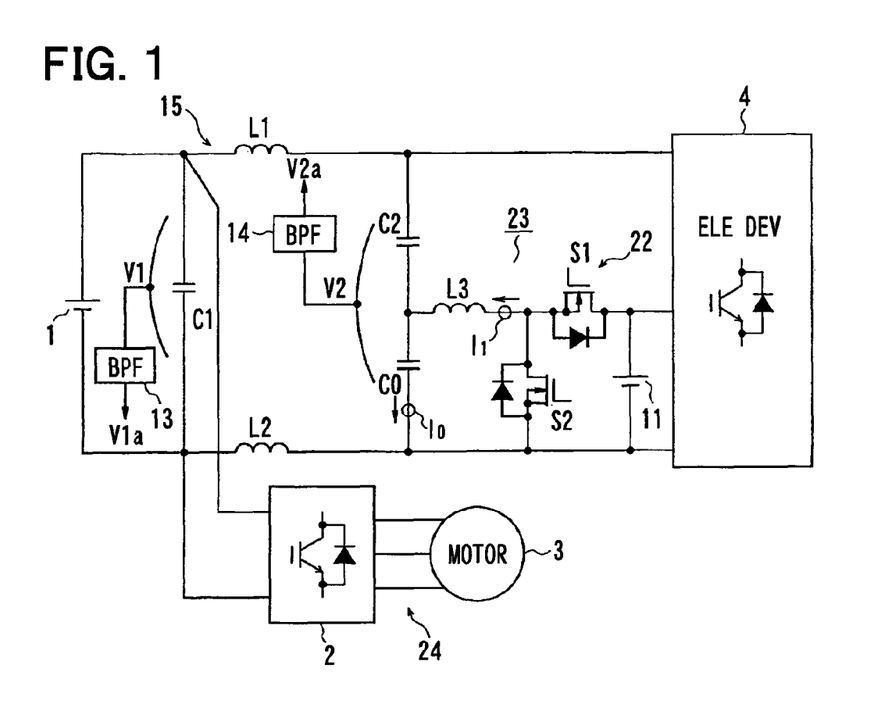
FIG. 1 is a diagram showing an electric device system including a resonant current limiting device according to a first embodiment.

As shown in FIG. 1, a capacitor C0 as an electric storage element is arranged between a smoothing capacitor C2 as a first capacitor and a ground. A series circuit including an inductor L3 and a N channel MOSFET S1 is connected between a common connection point of the capacitors C2, C0 and a driving power source 11.

The driving power source 11 may be built in the electric device 4 (i.e., a first electric device). Thus, both ends of the power source 11 correspond to power source terminals of the electric device 4. The voltage of the power source 11 is set to be lower than a voltage of the battery 1. The magnitude relationship of the capacitance among three capacitors C0, C1, C2 is "C1>C0>C2."

A N channel MOSFET S2 is connected between the ground and a source (i.e., the common connection point of the inductor L3) of the MOSFET S1. The switching operation control of the MOSFETs S1, S2 is performed by one of the control logic circuits 12A-12C shown in FIG. 2. The terminal voltage V1 of the capacitor C1 as a first capacitor is detected by a voltage detector (not shown). The terminal voltage V1 is filtered by a BPF as a band pass filter 13, so that the terminal voltage V1 is converted to a signal V1$a$, and then, the signal V1$a$ is input into the control logic circuit 12. Similarly, a series terminal voltage V2 of the capacitors C2, C0 is also detected by a voltage detector (not shown). The series terminal voltage V2 is filtered by the BPF 14, so that the voltage V2 is converted to a signal V2$a$. Then, the signal V2$a$ is input into the control logic circuit 12.

The capacitor C1, the inductor L1, the capacitor C2, the capacitor C0 and the inductor L2 provide the resonant current passage 15 having a loop shape. The passing frequency range of the BPF 13, 14 includes at least a resonant frequency of the resonant current passage 15.

Figure 2A:
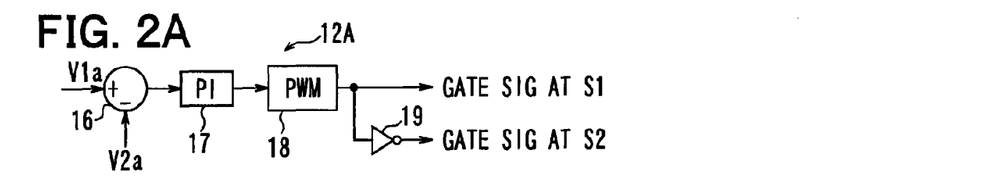
FIGS. 2A to 2C are diagrams showing a control logic circuit.

As shown in FIG. 2A, the control logic circuit 12A includes a subtracter 16, a proportional integral controller 17 (i.e., PI controller), a PWM (pulse width modulation) signal generator 18 and a NOT gate 19. The subtracter 16 calculates a difference between the signals V1$a$, V2$a$, and inputs the difference into the PI controller 17. The PI controller 17 executes a proportional integral operation of the input signal, so that a PWM control instruction signal is generated. Then, the PWM control instruction signal is input into the PWM signal generator 18. The PWM signal generator 18 compares the PWM control instruction signal with an amplitude of a carrier wave such as a triangle wave, which is generated in the generator 18, and therefore, a PWM signal is generated. The PWM signal is directly input into a gate of the MOSFET S1, and further, the PWM signal is input into the gate of the MOSFET S2 via the NOT gate 19.

Figure 2B:
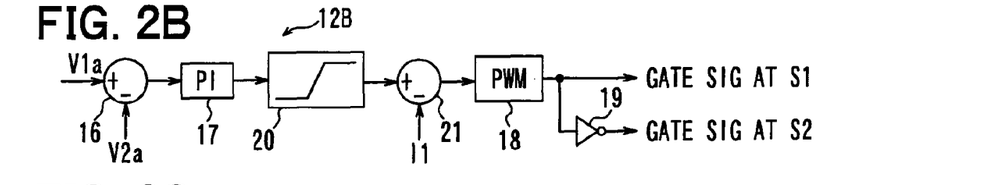

As shown in FIG. 2B, the control logic circuit 12B further includes a limiter 20 and a subtracter 21 disposed between the PI controller 17 of the control logic circuit 12A and the PWM signal generator 18. In this case, the current I1 flowing through the inductor L3 is detected by a current detector (not shown). The subtracter 21 calculates a difference between the output signal of the limiter 20 and the current I1, and then, inputs the difference into the PWM signal generator 18. Thus, excess current protection with respect to the current I1 is executed using the limiter 20.

Figure 2C:
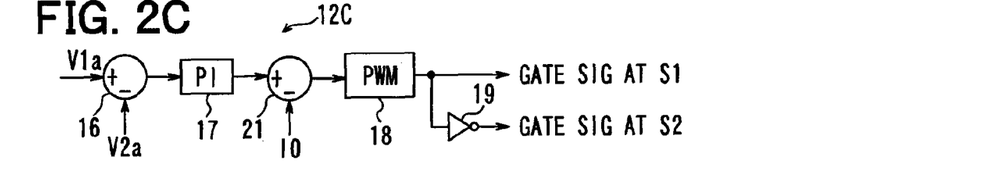

As shown in FIG. 2C, the control logic circuit 12C is prepared by removing the limiter 20 from the control logic circuit 12B, and current I0 flowing through the capacitor C0 instead of the current I1 is input into the circuit 12C as a subtraction signal of the subtracter 21. The inductor L3, the FET S1, the FET S2 and the control logic circuit 12 provide a voltage controller 22 as a depression type switching power source circuit. The resonant current passage 15, the voltage controller 22 and the driving power source 11 provide a resonant current limiting device 23. The inverter circuit 2 and the motor 3 provide the electric device 24 as a second electric device. In addition, the electric devices 4, 24 and the resonant current limiting device 23 provide an electric device system.

A function according to the first embodiment will be explained. The voltage of the capacitor C0 is controlled by the voltage controller 22 to be a predetermined positive polarity voltage (i.e., an instruction voltage) based on a charge supplied and absorbed by the power source 11 having a low voltage, which is sufficiently lower than the power source line on the battery side. The voltage controller 22 is a depression type chopper, and therefore, the voltage V1 of the capacitor C0 is controlled to be lower than the driving power source 11. On the other hand, the direct current voltage of the power source line in the electric device 4 is mainly applied to the smoothing capacitor C2.

For example, in a structure of FIG. 2A, a component V1$a$ in the frequency region including the resonant frequency is retrieved from a variation of the terminal voltage V1 of the smoothing capacitor C1. Further, a component V2$a$ in the frequency region including the resonant frequency is retrieved from a variation of the terminal voltage V2 of the smoothing capacitors C2, C0. The voltage of the smoothing capacitor C0 is controlled so as to equalize the voltages V1$a$, V2$a$. In this case, the voltage (i.e., the instruction voltage) of the smoothing capacitor C0 is controlled so that a total of the voltage variation of the smoothing capacitor C1 is equal to a total of the voltage variation of the smoothing capacitors C2, C0. The frequency region including the resonant frequency may be a part of a whole frequency region. Alternatively, the frequency region may be a whole frequency region. In this case, the BPF 13, 14 may be removed.

Thus, the voltage to be applied to the inductor L1, L2 does not include a resonant frequency component. Thus, the current having the resonant frequency component does not flow through the inductor L1, L2. This, the resonance to be occurred between the inductor L1, L2 and the smoothing capacitor C0, C1, C2 is restricted.

In the control logic circuit 12A, the MOSFET S1 and the MOSFET S2 are controlled in a PWM control manner based on a difference between the voltage variation V1$a$ including the resonant frequency component obtained from the terminal voltage V1 of the capacitor C1 and the voltage variation V2$a$ including the resonant frequency component obtained from the series terminal voltage V2. As a result, the voltage difference between the terminal voltages V1, V2 does not include the resonant frequency component.

The resonant operation generated in the resonant current passage 15 attributes to a feature such that the resonant frequency component is generated in the electric potential difference between the terminal voltages V1, V2. Thus, when the component is controlled to be zero, the occurrence of the resonant operation is restricted. Here, the BPF 13, 14 is not always necessary. However, when the BPF 13, 14 cuts (i.e., removes) a frequency component having a frequency higher than the passing region including the resonant frequency, the device avoids to mix the voltage variation, which the control of the terminal voltage of the capacitor C0 cannot follow, in a control system. Further, when the frequency component lower than the passing region is removed, the variation of the output voltage (i.e., the instruction voltage with respect to the terminal voltage of the capacitor C0) in the voltage controller 22 becomes small. Thus, the withstand voltage of the capacitor C0 may be selected to be lower.

The voltage controller 22 controls the voltage of the smoothing capacitor C0 according to the voltage variation of the resonant component. Thus, the direct current voltage of the capacitor C0 may be any voltage. Here, since the voltage controller 22 is a depression type chopper, the controller 22 cannot control when the voltage of the capacitor C0 is negative. Accordingly, it is sufficient to set the direct current voltage with respect to the capacitor C0 to be larger than a half amplitude of the variation component of the voltage. Thus, the driving power source 11 is used for outputting the direct current voltage sufficiently larger than the difference between the maximum and the minimum of the voltage variation, the direct current voltage of the capacitor C0 is set to be a half of the voltage of the power source 11.

In general, the variation of the voltage V1, V2 is sufficiently small, compared with the direct current voltage. When the terminal voltage of the capacitor C0 is controlled to match the variation of the voltage V2 with the variation of the voltage V1, the variation range of the voltage becomes small. Similarly, the direct current voltage sufficiently smaller than the power source in the electric device 4 is applied to the FET S1, S2 and a diode (not shown), which provide the voltage controller 22. Thus, elements in the FET S1, S2 and the diode having a low withstand voltage are used, similar to the smoothing capacitor C0. Further, when the voltage in the FET S1, S2 is small, the switching loss is also small. Thus, the driving frequency of the FET S1, S2 can be set to be a high frequency. Accordingly, the inductance of the inductor L3 can be designed to be small. Thus, the dimensions of the resonant current limiting device 23 are minimized.

Further, in the structure of FIG. 1, one end of the smoothing capacitor C0 and one end of the electric device 4 commonly provide the ground. Accordingly, the driving power source 11 and the electric device 4 commonly share the ground. Thus, a power source for a logic system used in the electric device 4 and/or a power source for driving a switching element may be commonly used as the power source for driving the capacitor C0. It is not necessary to prepare the driving power source 11 additionally.

Assuming that the construction described in JP-2000-295771 A is combined with the system in FIG. 9, the surge voltage may be generated at the power source terminal when the switching operation is performed on the electric device side. When the power source current of the electric device 4 is rapidly changed, the voltage of the power source terminal is transitionally reduced. On the other hand, in the present embodiment, the surge voltage is sufficiently smoothed by the series circuit of the smoothing capacitors C2, C0.

Since the smoothing capacitors C2, C0 are connected in series with each other in the present embodiment, the capacitance for smoothing the power source terminal of the electric device 4 is equivalently reduced when the capacitor C0 is added. Accordingly, the capacitance of the capacitor C0 may be sufficiently larger than the capacitor C2 so as to maintain the capacitance when the capacitor C0 is added.

Thus, in the present embodiment, the capacitors C1, C2 are connected to the wiring passage including the inductors L1, L2 so that the resonant current passage 15 having the loop shape is formed. In the passage 15, the capacitor C2 is connected in series with the capacitor C0. The voltage controller 22 restricts the resonant current component flowing through the wiring passage by controlling the terminal voltage of the capacitor C0 to be a predetermined instruction voltage with charging and discharging the electric charge supplied from the driving power source 11. Accordingly, the resonance is restricted with high efficiency without generating the switching surge.

The direct current power is supplied from the battery 1 to the driving power source 11, and the series connection of the capacitors C2, C0 is used as the inner power source of the electric device 4 for functioning as the smoothing capacitor. Thus, the oscillation does not influence the operation of the electric device 4. In this case, the negative side terminal of the capacitor C0 is commonly connected to the ground of the power source 11, and therefore, the voltage controller 22 provides easily a non-isolated circuit.

Further, since the capacitor C1 functions as the smoothing capacitor of the electric device 24, and the electric device 24 is connected in parallel, the resonance to be generated in a case where the electric device 24 functions with large current is restricted. Thus, the influence of the resonance to the electric device side is restricted. The magnitude relationship of the capacitance among three capacitors C0, C1, C2 is set to be "C1>C0>C2." In view of the magnitude relationship of the load current between the electric device 24 and the electric device 4, the magnitude relationship of the capacitance between two capacitors C1, C2 is, in general, set to be "C1>C2." In this case, the capacitor C0 having the capacitance larger than the capacitor C2 is connected in series, the reduction of the capacitance of the smoothing capacitor on the electric device side is restricted. In addition, the smoothing capacitor C0 is connected in series with the capacitor C2 instead of the capacitor C1. Thus, the capacitance of the smoothing capacitor C0 required for restricting the reduction of the capacitance of the smoothing capacitor is minimized. Accordingly, the dimensions of the smoothing capacitor C0 are minimized.

The voltage controller 22 provides the switching power source circuit. The instruction voltage having the positive polarity to be applied to the capacitor C0 is determined to subtract the voltage variation difference of "V1$a$-V2$a$," in the frequency range including at least the resonant frequency of the resonant current passage 15, from the difference of the voltages V1, V2. Accordingly, the circuit structure of the voltage controller 22 is simplified, so that the electric power loss is reduced. Further, the instruction voltage is generated and output so as to effectively restrict the resonance.

Modification of the First Embodiment

Figure 3:
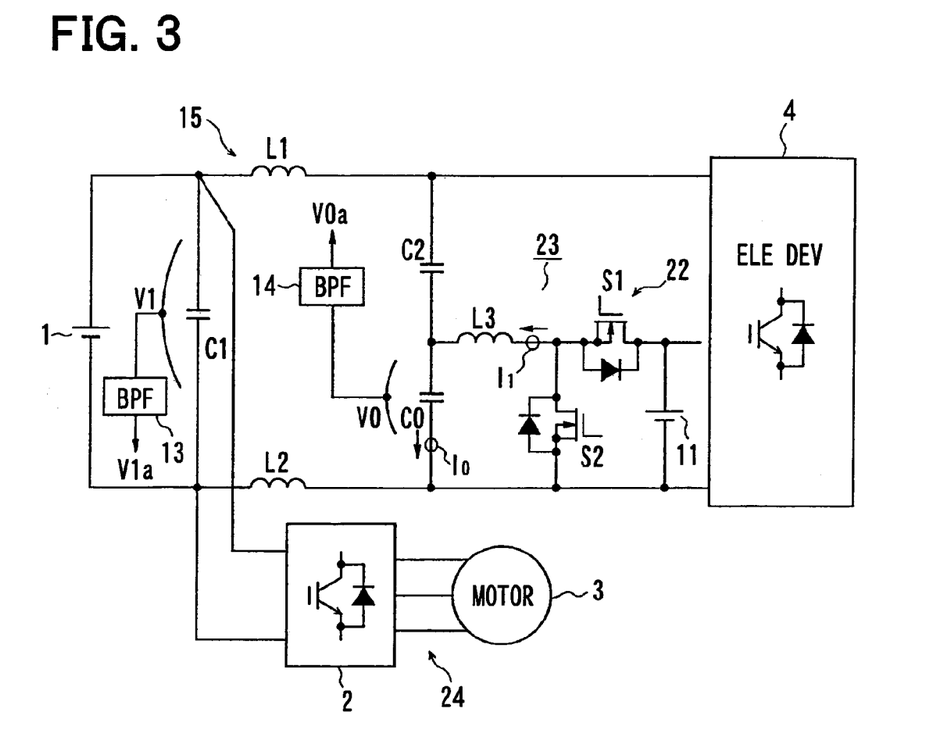
FIG. 3 is a diagram showing an electric device system including a resonant current limiting device according to a modification of the first embodiment.

When the current retrieved from the power source terminal to the electric device 4 does not include the resonant current component, the voltage V2 is capable of setting to be the terminal voltage of the capacitor C0. In this case, since the resonant current component does not flow through the electric device 4, a whole of the resonant current component supplied from the inductor L1, L2 flows through the series circuit of the capacitors C2, C0.

For example, the voltage of the capacitor C0 is controlled to be equal to the voltage variation of the capacitor C1, so that the resonance component of the voltage to be applied to the series connection of the inductors L1, L2 and the capacitor C2 is kept to be zero. In this case, the electric device 4 does not generate the resonant current component. Thus, the current having the resonant component of the inductors L1, L2 always flows through the capacitor C2. Thus, when the resonant component of the voltage to be applied to the series connection of the inductor L1, L2 and the capacitor C2 becomes zero, the current having the resonant component is kept to be zero. Thus, the resonance is effectively restricted.

Figure 4:
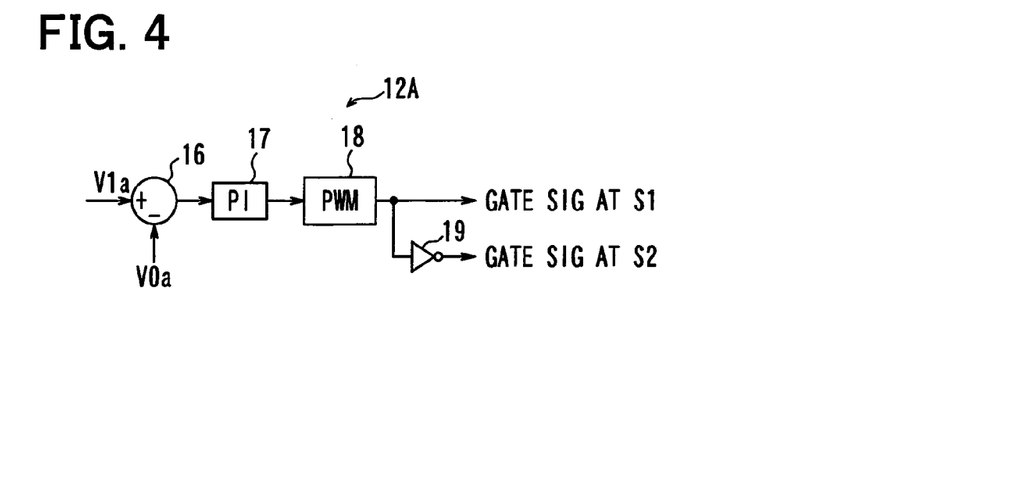
FIG. 4 is a diagram showing a control logic circuit.

Thus, as shown in FIG. 3, the terminal voltage V0 of the capacitor C0 is filtered with the BPF 14, so that the voltage V0 of the resonant frequency component is retrieved. As shown in FIG. 4, the voltage V0a instead of the voltage V2a is input into the subtracter 16. The device may have such a structure.

In the modification, the voltage controller 22 determines the instruction voltage by subtracting the voltage variation, in the frequency range including at least the resonant frequency of the resonant current passage 15, from an adding result of the applied voltage of the capacitor C2 with the sum of voltages applied to the inductors L1, L2 arranged in the resonant current passage 15. In this case, the instruction voltage is generated and output so as to restrict the resonance.

Second Embodiment

Figure 5:
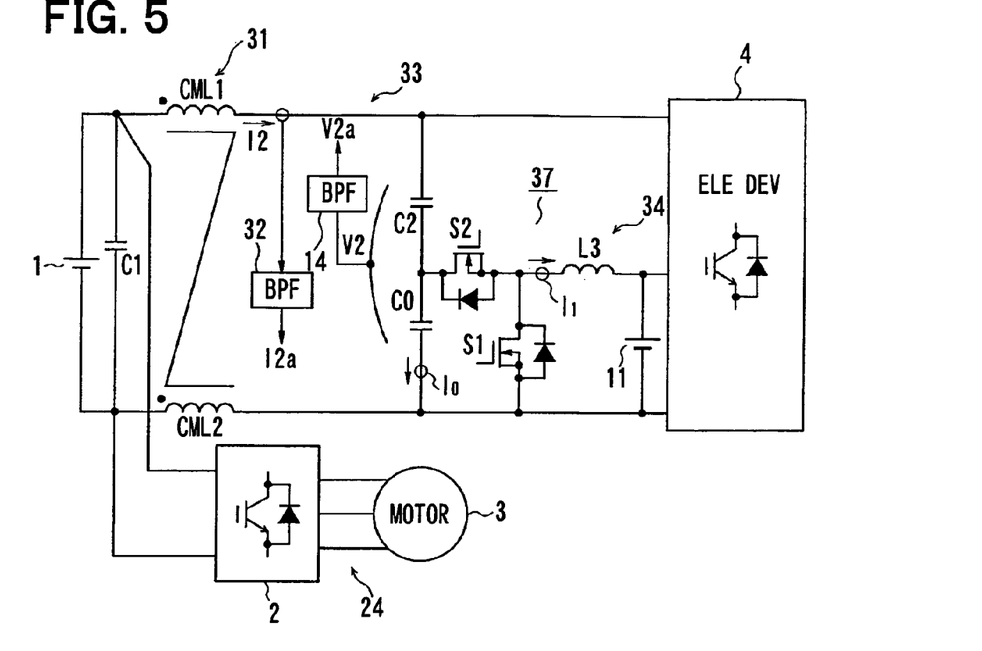
FIG. 5 is a diagram showing an electric device system including a resonant current limiting device according to a second embodiment.

The variation of the current flowing through the inductors L1, L2 is detected, instead of the voltage V1 according to the first embodiment. The voltage of the capacitor C0 may be controlled such that the voltage variation in proportion to the detected variation of the current appears on the voltage V2. When the variation of the current includes the component having the resonant frequency, the voltage variation in proportion to the resonant current is generated on the voltage V2 (i.e., the power source voltage of the electric device 4) accordingly.

Thus, a whole of the electric device 4 together with the smoothing capacitors C2, C0 are deemed to be a series circuit of the capacitor and the resistor equivalently in at least a resonant frequency component. Accordingly, the resonant current generated between the inductors L1, L2 and the smoothing capacitors C0, C1, C2 flows through a passage, on which a resistor is added equivalently. The resonant current is restricted. When the equivalent resistor is sufficiently large, the resonant component in the applied voltage of the inductor L1, L2 becomes zero.

As shown in FIG. 5, in the second embodiment, a common mode choke coil 31 (i.e., ZCML1, CML2) instead of the inductor L1. L2 is arranged on the power source line. Based on the above principle, the BPF 13 is removed, and the current I2 flowing through the coil CML1 instead of the voltage V1a is detected. The current I2a filtered by the BPF 32 is used for a control. The inductor L1, L2 of the resonant current passage 15 according to the first embodiment is replaced to the coil CML1, CML2, so that the resonant current passage 33 is prepared.

In the voltage controller 34 instead of the voltage controller 22, the FET S1 and the FET S2 are replaced with each other in the first embodiment, and the drain of the FET S2 is connected to a common connection point of the capacitors C0, C2. Further, the inductor L3 is connected between the source of the FET S2 and the positive side terminal of the driving power source 11, so that the boost chopper is prepared.

Figure 6A:
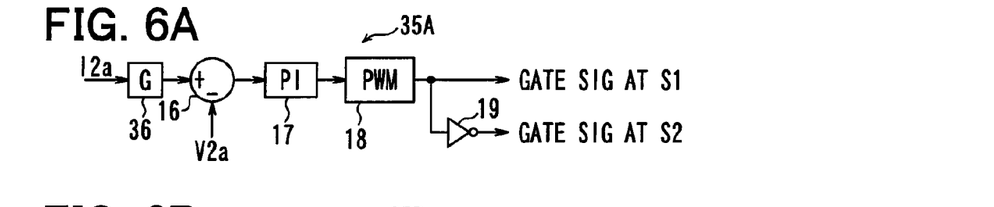
FIGS. 6A to 6C are diagrams showing a control logic circuit.
Figure 6B:
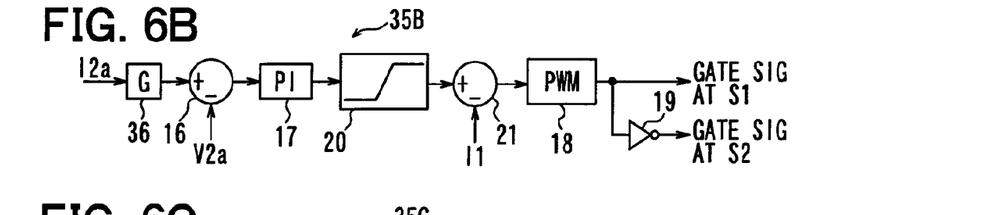
Figure 6C:
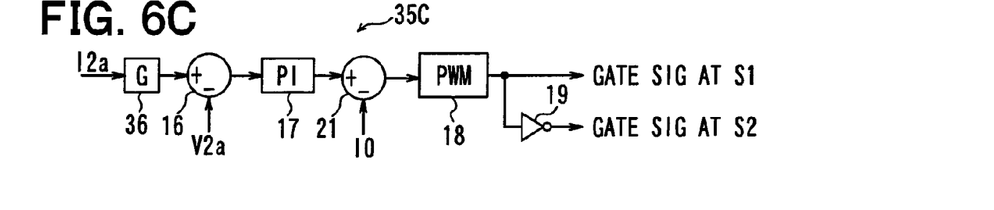

The control logic circuit 35 shown in FIG. 6 is used in the voltage controller 34. The control logic circuits 35A to 35C utilize current, which is prepared by amplifying the current I2a with an amplifier 36, instead of the voltage V1a input into the logic circuit 12A to 12C. The resonant current passage 33, the voltage controller 34 and the driving power source 11 provide the resonant current limiting device 37.

Thus, in the second embodiment, the voltage controller 34 determines the instruction voltage to be applied to the capacitor C0 such that the variation of the voltage V2 to be applied to the series circuit of the capacitors C2, C0 is in proportion to the variation of the current I2 on the resonant current passage 33 in the frequency range including at least the resonant frequency of the resonant current passage 33. In this case, the instruction voltage is generated and output so as to restrict the resonance.

When the resonant current component does not flow in the electric device 4, a whole of the resonant current component passing through the coils CML1, CML2 flows through the capacitors C2, C0. Thus, in the second embodiment, similar to the modification of the first embodiment, the variation of the terminal voltage V0 of the capacitor C0 is set to be in proportion to the current I2 flowing through the coil CML1, so that an equivalent circuit, in which the resistor is added on the resonant current passage 33 equivalently, is provided. Thus, the resonant current is effectively restricted.

Further, in the second embodiment, it is not necessary to detect the terminal voltage V1 of the capacitor C1 according to the first embodiment. Accordingly, when the inverter circuit 2 is disposed at a place spaced apart from the battery 1, the resonant current limiting device 37 together with the electric device 4 is easily integrated into one unit.

Further, since the voltage controller 34 is the boost chopper, even if the variation range (i.e., a peak to peak value) of the terminal voltage in the capacitor C0 is large, the instruction voltage can be increased according to the variation range. Thus, the resonance is surely restricted.

Third Embodiment

Figure 7:
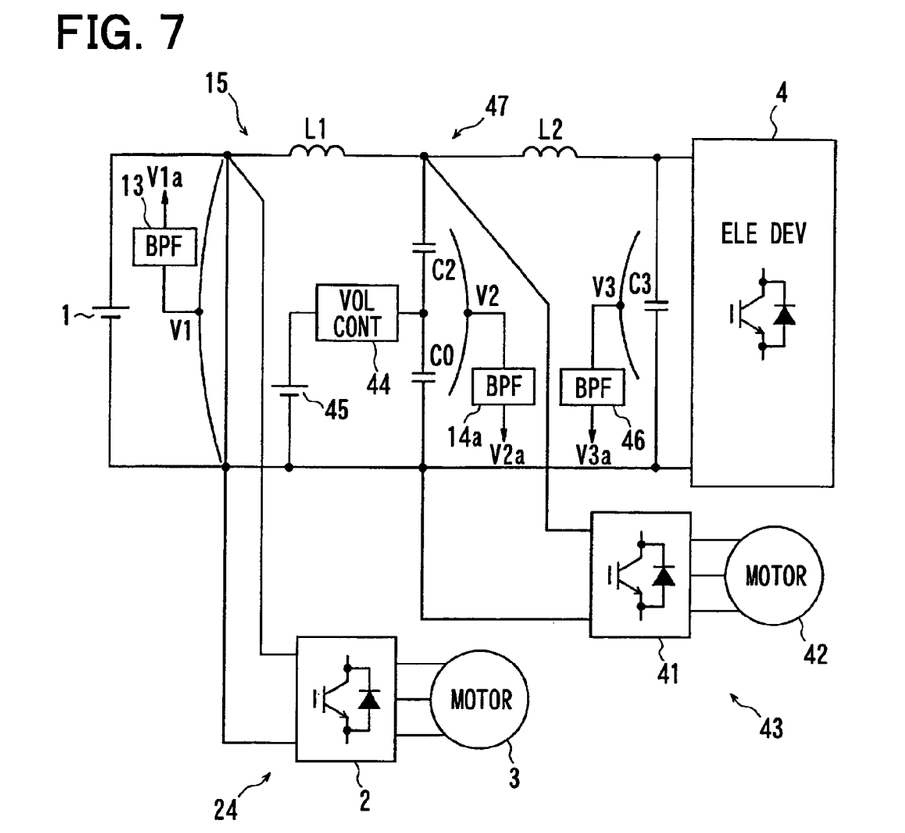
FIG. 7 is a diagram showing an electric device system including a resonant current limiting device according to a third embodiment.

As shown in FIG. 7, the electric device system according to the third embodiment includes the inductor L2 arranged on the positive side power source line for connecting between the series circuit of the capacitors C2, C0 and the electric device 4. Further, the smoothing capacitor C3 is connected in parallel to the electric device 4. Further, the inverter circuit 41 is connected to the series circuit of the capacitors C2, C0. The inverter circuit 41 droves and controls the motor 42. The inverter circuit 41 and the motor 42 provide the electric device 43.

The voltage controller 44 instead of the voltage controller 22 is arranged, and the voltage controller 44 is connected to the power source 45 for driving. The BPF 46 is arranged to filter the terminal voltage V3 of the capacitor C3 so that the voltage signal V3a prepared by passing a predetermined frequency range in the terminal voltage V3 is output. Here, similar to the first embodiment, the capacitor C1 may be connected. Alternatively, a negative side inductor corresponding to each inductor L1, L2 may be arranged.

The resonant frequency f1 of the resonant current passage 15 including the battery 1, the inductor L1 and the capacitors C2, C0 is different from the resonant frequency f2 of the resonant current passage 47 including the capacitor C3, the inductor L2 and the capacitors C2, C0. The BPF 13 is a filter for passing a predetermined range including the frequency f1, and the BPF 46 is a filter for passing a predetermine range including the frequency f2. Further, the BPF 14a is a filter for passing both of the frequency f1 and the frequency f2.

The voltage controller 44 controls the instruction voltage to be applied to the capacitor C0 so as to equalize the voltage signal V2a with a sum of the voltage signals V1a, V3a (i.e., V2a=V1a+V3a). In this case, the resonance generated at each frequency f1, f2 is restricted.

Fourth Embodiment

Figure 8:
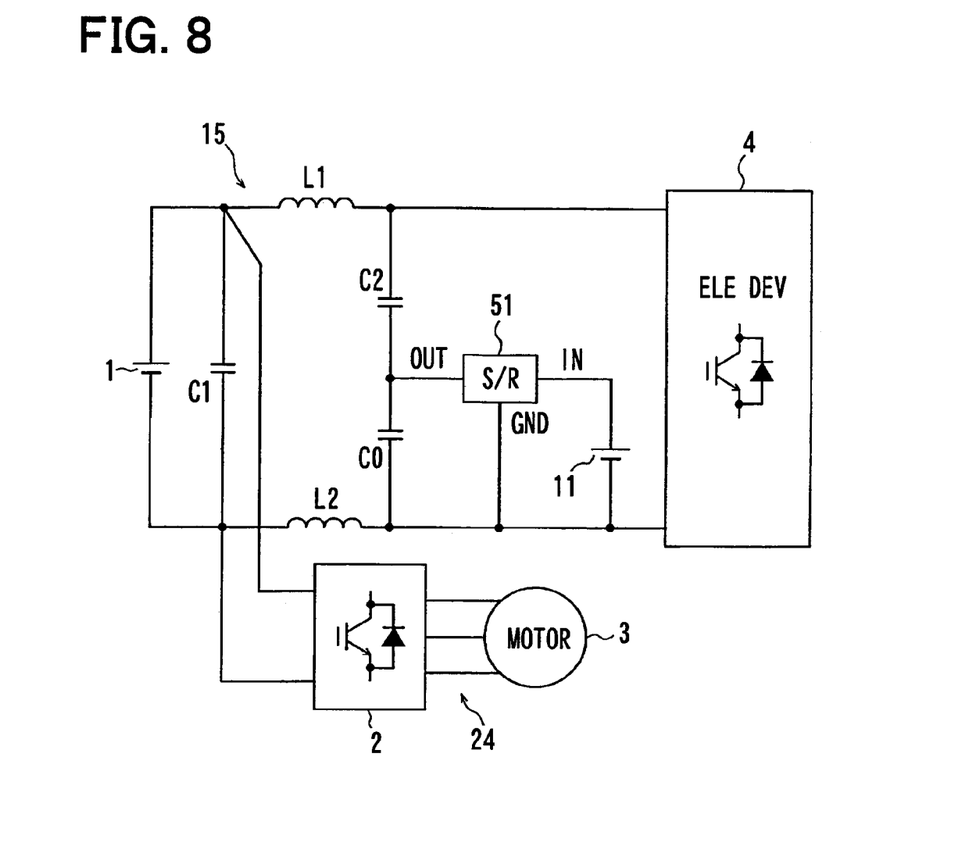
FIG. 8 is a diagram showing an electric device system including a resonant current limiting device according to a fourth embodiment.

As shown in FIG. 8, in the electric device system according to the fourth embodiment, the voltage controller 51 instead of the voltage controller 22 is arranged. The voltage controller 51 is configured to a series regulator S/R. In this case, effects similar to the first embodiment are obtained.

The driving power source 11 may not be always built in the electric device 4. Alternatively, the power source 11 may be an independent power source.

The voltage controller 22 and the one end of the capacitor C0 are connected to the ground of the electric device 4. Alternatively, the voltage controller 22 and the one end of the capacitor C0 may be connected to any part of the system as long as the voltage controller 22 and the one end of the capacitor C0 is connected in parallel to the power source terminal and connected in series with the capacitor C2.

The capacitor C0 may be connected in series with the capacitor C1.

The inductor L1, L2 may not be necessary. The inductance component parasitized on a wiring between the capacitors C1, C2 may be used instead of the inductors L1, L2.

The electric device 24 may not be arranged in the system.

The electric storage element may be different from the capacitor.

The electric device may be other electric generators or a UPS (i.e., uninterruptible power supply).

Further, the BPF may be a filter for cutting only a direct current component. Alternatively, the BPF may be a high pass filter for passing the resonant frequency component. In the first and fourth embodiments, when the voltages V1, V2 are compared with each other, and the terminal voltage of the capacitor C0 is controlled, since the direct current component of the voltage V1 is equal to the direct current component of the voltage V2, the BPF for the voltages V1, V2 may be removed from the system. Similarly, in the second embodiment, when the direct current component does not include in the operation current I2 of the electric device 4, the BPF for the current I2 and the voltage V2 or the voltage V0 may be removed from the system.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A resonant current limiting device for a resonant current passage having a loop shape including at least one capacitor and a wiring passage that includes at least one inductor or at least one inductance component, the resonant current limiting device comprising:
    an electric storage element connected in series with the capacitor;
    a driving power source; and
    a voltage controller that charges and discharges an electric charge in the electric storage element, which is supplied from the driving power source, controls a terminal voltage of the electric storage element to be a predetermined instruction voltage, and restricts a resonant current component flowing through the wiring passage,
    wherein a series circuit of the capacitor and the electric storage element is connected in parallel to a power source terminal of an electric device without passing through the wiring passage,
    wherein the electric device is energized from a direct current power source, which is different from the driving power source, and
    wherein the voltage controller is a chopper or a series regulator.

2. The resonant current limiting device according to claim 1,
    wherein a direct current power source is connected to a series circuit of the capacitor and the electric storage element.

3. The resonant current limiting device according to claim 1,
    wherein one end of the power source terminal of the electric device is connected to the electric storage element.

4. The resonant current limiting device according to claim 1,
    wherein the driving power source is used for an inside element of the electric device, and
    wherein the driving power source is disposed in the electric device.

5. The resonant current limiting device according to claim 1,
    wherein the capacitor is defined as a first capacitor, and the electric device is defined as a first electric device,
    wherein the series circuit of the first capacitor and the electric storage element is connected in parallel to a power source terminal of a second electric device with passing through the wiring passage, and
    wherein the second electric device is connected to a second capacitor and a second power source to be energized.

6. The resonant current limiting device according to claim 1,
    wherein the voltage controller determines the predetermined instruction voltage to remove a voltage variation in a frequency range including at least a resonant frequency of the resonant current passage from a sum of voltage to be applied to a whole of inductance in the resonant current passage.

7. The resonant current limiting device according to claim 1,
wherein the voltage controller determines the predetermined instruction voltage to remove a voltage variation in a frequency range including at least a resonant frequency of the resonant current passage from a calculation result of adding a voltage applied to the capacitor connected in series with the electric storage element to a sum of voltage to be applied to a whole of inductance in the resonant current passage.

8. The resonant current limiting device according to claim 1,
wherein the voltage controller determines the predetermined instruction voltage to set a voltage variation applied to the electric storage element to be proportional to a current variation in the resonant current passage in a frequency range including at least a resonant frequency of the resonant current passage.

9. The resonant current limiting device according to claim 1,
wherein the voltage controller determines the predetermined instruction voltage to set a voltage variation applied to a series circuit of the electric storage element and the capacitor to be proportional to a current variation in the resonant current passage in a frequency range including at least a resonant frequency of the resonant current passage.

10. The resonant current limiting device according to claim 1,
wherein the electric storage element is another capacitor.

11. The resonant current limiting device according to claim 1,
wherein a capacitance of the electric storage element is larger than a capacitance of the capacitor connected in series with the electric storage element.

12. The resonant current limiting device according to claim 1,
wherein the resonant current passage further includes at least another capacitor different from the capacitor connected in series with the electric storage element, and
wherein a capacitance of the capacitor connected in series with the electric storage element is smaller than a capacitance of the at least another capacitor.

13. The resonant current limiting device according to claim 1,
wherein a direct current voltage of the driving power source is lower than a direct current voltage applied to the capacitor.

14. The resonant current limiting device according to claim 1,
wherein the voltage controller is a switching power source circuit.

15. The resonant current limiting device according to claim 1,
wherein the voltage controller determines the predetermined instruction voltage to maintain a polarity of a voltage applied to the electric storage element.

16. The resonant current limiting device according to claim 1,
wherein the driving power source and the voltage controller are connected in series with each other between both ends of the electric storage element.

17. The resonant current limiting device according to claim 1,
wherein the at least one capacitor, the electric storage element and the at least one inductor or the at least one inductance component are connected in series with each other in the resonant current passage.

18. The resonant current limiting device according to claim 1,
wherein the voltage controller further comprises:
a first field effect transistor connected between a positive end of the driving power source and an intermediate node,
a second field effect transistor connected between a negative end of the driving power source and the intermediate node, and
an inductor connected to the intermediate node.

* * * * *